(12) United States Patent
Laing

(10) Patent No.: US 9,545,914 B2
(45) Date of Patent: Jan. 17, 2017

(54) HYBRID ELECTRIC VEHICLE CONTROLLER AND METHOD OF CONTROLLING A HYBRID ELECTRIC VEHICLE

(75) Inventor: Philippa Laing, Coventry (GB)

(73) Assignee: Jaguar Land Rover Limited (GB)

( * ) Notice: Subject to any disclaimer, the term of this patent is extended or adjusted under 35 U.S.C. 154(b) by 160 days.

(21) Appl. No.: 13/997,528

(22) PCT Filed: Dec. 23, 2011

(86) PCT No.: PCT/EP2011/074043
§ 371 (c)(1),
(2), (4) Date: Sep. 23, 2013

(87) PCT Pub. No.: WO2012/085295
PCT Pub. Date: Jun. 28, 2012

(65) Prior Publication Data
US 2014/0012450 A1    Jan. 9, 2014

(30) Foreign Application Priority Data

Dec. 23, 2010    (GB) .................................. 1021842.8

(51) Int. Cl.
*B60L 9/00*    (2006.01)
*B60W 20/00*    (2016.01)
(Continued)

(52) U.S. Cl.
CPC ............. *B60W 20/106* (2013.01); *B60L 11/14* (2013.01); *B60L 11/1861* (2013.01);
(Continued)

(58) Field of Classification Search
None
See application file for complete search history.

(56) References Cited

U.S. PATENT DOCUMENTS 5,815,824 A    9/1998  Saga et al.
5,842,534 A    12/1998 Frank
(Continued)

FOREIGN PATENT DOCUMENTS

CN    101417653 A    4/2009
CN    101542095 A    9/2009
(Continued)

OTHER PUBLICATIONS

International Search Report dated Jul. 5, 2012, International Application No. PCT/EP2011/074043; 5 pages.
(Continued)

*Primary Examiner* — Adam Alharbi
(74) *Attorney, Agent, or Firm* — Myers Bigel, P.A.

(57) ABSTRACT

Embodiments of the invention provide a controller for a hybrid electric vehicle (HEV) having an engine and an electric machine, the controller being configured upon start-up to control an electric machine to provide torque to drive a vehicle with an engine off if a state of charge (SoC) of an energy storage device is above an EV-start SoC threshold and to start an engine if a SoC of an energy storage device is below the EV-start SoC threshold, wherein the EV-start SoC threshold is determined to be one selected from amongst a value sufficient to allow a vehicle to travel a prescribed distance before a SoC falls below a SoC minimum level at which an engine is started and a value sufficient to allow a vehicle to operate for a prescribed time period before a SoC falls below the SoC minimum level.

14 Claims, 2 Drawing Sheets

(51) Int. Cl.
| | |
|---|---|
| *B60L 11/14* | (2006.01) |
| *B60L 11/18* | (2006.01) |
| *B60L 15/20* | (2006.01) |
| *B60W 10/06* | (2006.01) |
| *B60W 10/08* | (2006.01) |
| *B60W 10/26* | (2006.01) |
| *B60W 30/18* | (2012.01) |
| *B60W 50/00* | (2006.01) |

(52) U.S. Cl.
CPC ......... *B60L 15/2072* (2013.01); *B60W 10/06* (2013.01); *B60W 10/08* (2013.01); *B60W 10/26* (2013.01); *B60W 20/00* (2013.01); *B60W 20/13* (2016.01); *B60W 30/18027* (2013.01); *B60W 50/0097* (2013.01); *B60W 2510/244* (2013.01); *B60W 2530/14* (2013.01); *B60W 2530/22* (2013.01); *B60W 2550/12* (2013.01); *B60W 2550/22* (2013.01); *B60W 2550/402* (2013.01); *B60W 2710/244* (2013.01); *Y02T 10/6291* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y02T 10/84* (2013.01); *Y10S 903/93* (2013.01)

(56) References Cited

U.S. PATENT DOCUMENTS

| | | | |
|---|---|---|---|
| 6,336,889 | B1 | 1/2002 | Oba et al. |
| 7,766,108 | B2 | 8/2010 | Rimaux et al. |
| 2002/0029624 | A1 | 3/2002 | Gassner et al. |
| 2004/0006414 | A1 | 1/2004 | Suzuki |
| 2007/0246554 | A1 | 10/2007 | Watanabe et al. |
| 2008/0129049 | A1 | 6/2008 | Sauvlet et al. |
| 2008/0147260 | A1* | 6/2008 | Moran ............................ 701/22 |
| 2009/0156355 | A1 | 6/2009 | Oh et al. |
| 2010/0063662 | A1 | 3/2010 | Harada et al. |
| 2010/0070123 | A1 | 3/2010 | Itoh et al. |
| 2011/0287889 | A1 | 11/2011 | Eisele et al. |
| 2012/0146582 | A1* | 6/2012 | Lei et al. ...................... 320/109 |
| 2013/0146024 | A1* | 6/2013 | Cunningham et al. .. 123/406.53 |
| 2014/0190426 | A1* | 7/2014 | Carvignese et al. .............. 123/2 |
| 2014/0202423 | A1* | 7/2014 | Carvignese et al. .......... 123/321 |

FOREIGN PATENT DOCUMENTS

| | | |
|---|---|---|
| DE | 102007050230 A1 | 4/2009 |
| DE | 102009000706 A1 | 8/2010 |
| EP | 0916547 A2 | 5/1999 |
| EP | 0922600 A2 | 6/1999 |
| EP | 1925521 A2 | 5/2008 |
| EP | 1975028 A2 | 10/2008 |
| EP | 2141056 A1 | 1/2010 |
| FR | 2882698 A1 | 9/2006 |
| JP | H11103502 A | 4/1999 |
| JP | 2004-176624 A | 6/2004 |
| JP | 2005160270 A | 6/2005 |
| JP | 2005163545 A | 6/2005 |
| JP | 2008-201165 A | 9/2008 |
| JP | 2009248860 A | 10/2009 |
| JP | 2010139396 A | 6/2010 |
| WO | WO 2010137119 A1 | 12/2010 |

OTHER PUBLICATIONS

International Search Report for PCT Application No. PCT/EP2012/051485 dated Jul. 2, 2012; 4 pages.

International Search Report for PCT Application No. PCT/EP2012/051486 dated Jul. 4, 2012; 3 pages.

International Search Report for PCT Application No. PCT/EP2012/051487 dated Jul. 10, 2012; 4 pages.

International Search Report for PCT Application No. PCT/EP2012/051488 mailed Oct. 10, 2012; 6 pages.

Written Opinion for PCT Application No. PCT/EP2011/074043 mailed Jun. 23, 2013; 6 pages.

Dextreit, Clement; "Hybrid Electric Vehicle Controller and Mehtod of Controlling a Hybrid Electric Vehicle"; U.S. Appl. No. 13/983,230, filed Aug. 1, 2013; 42 pages.

Hancock, Matthew; "Hybrid Electric Vehicle Controller and Method of Controlling a Hybrid Electric Vehicle"; U.S. Appl. No. 13/983,235, filed Aug. 1, 2013; 28 pages.

Hancock et al., Matthew; "Hybrid Electric Vehicle and Method of Controlling a Hybrid Electric Vehicle"; U.S. Appl. No. 13/983,238, filed Aug. 1, 2013; 19 pages.

Hancock et al., Matthew; "Hybrid Electric Vehicle Controller and Method of Controlling a Hybrid Electric Vehicle"; U.S. Appl. No. 13/983,239, filed Aug. 1, 2013; 36 pages.

Office Action, Japanese Patent Application No. 2015-232916, Aug. 2, 2016, 7 pages.

\* cited by examiner

HYBRID ELECTRIC VEHICLE CONTROLLER AND METHOD OF CONTROLLING A HYBRID ELECTRIC VEHICLE

CROSS REFERENCE TO RELATED APPLICATIONS

This application is a National Phase Application of Patent Application PCT/EP2011/074043 filed on 23 Dec. 2011, which claims priority to GB1021842.8, filed 23 Dec. 2010, of which both applications are incorporated by reference herein in their entirety.

FIELD OF THE INVENTION

The present invention relates to a controller for a hybrid electric vehicle (HEV), a HEV and a method of controlling a HEV. In particular but not exclusively the invention relates to a controller for a parallel-type HEV, to a parallel-type HEV and to a method of controlling a parallel-type HEV during starting of the vehicle. Aspects of the invention relate to a controller, to a method and to a vehicle.

BACKGROUND

It is known to provide a hybrid electric vehicle (HEV) having an electric machine and an internal combustion engine (ICE) connected in parallel to a driveline of the vehicle.

The vehicle may be operated in an electric vehicle (EV) mode in which torque to the driveline is provided exclusively by the electric machine. Alternatively the vehicle may be operated in a parallel mode in which torque is provided to the driveline by the ICE and electric machine.

STATEMENT OF THE INVENTION

Aspects of the invention provide a controller, a vehicle and a method as claimed in the appended claims.

According to another aspect of the invention for which protection is sought there is provided a controller for a hybrid electric vehicle (HEV) having an engine and an electric machine, the controller being configured upon start-up to control an electric machine to provide torque to drive a vehicle with an engine off if a state of charge (SoC) of an energy storage device is above an EV-start SoC threshold and to start an engine if a SoC of an energy storage device is below the EV-start SoC threshold, wherein the EV-start SoC threshold is determined to be one selected from amongst a value sufficient to allow a vehicle to travel a prescribed distance before a SoC falls below a SoC minimum level at which an engine is started and a value sufficient to allow a vehicle to operate for a prescribed time period before a SoC falls below the SoC minimum level.

It is to be understood that by 'start-up' is meant a transition of the vehicle from a condition in which the vehicle is not ready to move under its own power to a condition in which the vehicle is ready to move under its own power. For example in embodiments having a transmission and accelerator pedal, upon start-up the vehicle is ready to move under its own power (by means of the electric machine and/or the engine depending upon the type of hybrid vehicle, e.g. parallel or series) if the transmission is engaged and the accelerator pedal is pressed.

Some embodiments of the invention have the advantage that because start-up in EV mode is performed when conditions permit the likelihood of start-up occurring in EV mode is increased. This has the advantage that a vehicle may provide a more consistent start-up experience for a driver of the vehicle.

Embodiments of the invention have the advantage that a risk that the driver of the vehicle is disappointed that the vehicle only travels a relatively short distance in EV mode in some embodiments, or for a relatively short time period in other embodiments, before the engine is started, may be reduced. Furthermore a noise, vibration and harshness performance of the vehicle may be enhanced since NVH associated with engine start is more likely to occur either upon initial start-up of the vehicle or after the vehicle has travelled a prescribed distance. In addition, embodiments of the invention allow a more consistent 'feel' to operation of the vehicle to be maintained. This is in part because the vehicle is more likely to start in EV mode than known vehicles. Furthermore, a risk of distraction of an operator or persons around a vehicle due to starting of an engine soon after launch of the vehicle is reduced.

These factors can be important since a vehicle is often required to perform manoeuvres in relatively confined spaces upon launch, e.g. when reversing from a parking bay, manoeuvring from a parallel-parked position, exiting a driveway or parking garage, entering a parking ramp and other similar situations.

Furthermore, in the case of off-road driving it may be distracting to a driver if the engine starts when the driver is performing a particular manoeuvre such as descending a slope or driving through a narrow gap.

It is to be understood that if the vehicle travels at a relatively low speed, the time between start-up of the vehicle and engine start will be longer than if the vehicle travels at a relatively high speed. However, NVH performance of a vehicle is typically degraded by engine start to a lesser extent at high speed than low speed due to the higher levels of NVH associated with higher speeds. Thus an operator of the vehicle is less likely to notice NVH associated with engine start when the vehicle is travelling at speed, and therefore be less concerned that the vehicle has travelled only a relatively short distance before starting the engine.

Furthermore, embodiments of the invention have the advantage that because the vehicle attempts to travel by means of torque provided by the electric machine with the engine off by default, nuisance noise associated with starting of the engine and initial driving of a vehicle in a residential area may be reduced. Thus a driver departing from a residential area early in the morning enjoys a reduced risk of disturbing residents of the area.

Thus embodiments of the invention may provide a significant enhancement to a level of driver enjoyment of a vehicle.

Advantageously the controller may be operable to determine the value of the EV-start SoC threshold responsive to one or more vehicle state parameters, said one or more state parameters being indicative of a state of a vehicle, said one of more state parameters being indicative of an amount of charge an energy storage device is likely to be required to provide to drive a vehicle with an engine off.

Further advantageously the one or more vehicle state parameters may be selected from amongst an amount of current being drawn from a battery, an operational state of one or more vehicle accessories, a state of one or more electrical heating functions, an ambient light level, a state of one or more vehicle running lights, a vehicle loading and a determination whether a vehicle is towing a load.

Thus it is to be understood that the controller may be configured to determine a distance a vehicle is likely to be able to travel or a time period for which a vehicle is likely to be able to operate responsive to the one or more vehicle state parameters.

Advantageously the controller may be operable to determine the EV-start SoC threshold responsive to historical data in respect of a journey conducted by a vehicle.

The controller may be operable to determine the EV-start SoC threshold responsive to energy consumption data in respect of at least a portion of a previous journey made by a vehicle.

Optionally the controller is operable to determine the EV-start SoC threshold responsive to data in respect of a geographical location of a vehicle.

Advantageously the controller may be operable to determine the EV-start SoC threshold responsive to data in respect of at least one selected from amongst an average speed of a vehicle on a route from a current geographical location of a vehicle, a speed limit associated with a route of a vehicle from a current geographical location and terrain data in respect of a route of a vehicle from a current geographical location.

Thus the vehicle may be operable to determine a likely charge drain on an energy storage device in order to control a vehicle to travel at an average speed of a vehicle on a route from a current location or to travel at a speed limit of a vehicle on a route from a current location. In some embodiments the controller may be configured to determine a likely charge drain taking into account whether a vehicle must negotiate one or more slopes on one or more routes from a current location.

Optionally the prescribed distance or prescribed time period is itself responsive to one or more parameters.

Advantageously the prescribed distance or prescribed time period may be responsive to a geographical location of a vehicle.

Further advantageously the prescribed distance or prescribed time period may be responsive to a determination whether a vehicle is located in an urban or non-urban area.

The prescribed distance or prescribed time period may be set to lower values in an urban area thereby to increase a likelihood of a vehicle starting a journey in EV mode.

It is to be understood that in some situations if a vehicle is located in an urban area, an average speed of a vehicle may be expected to be lower than operations in non-urban areas. Consequently a rate of charge drain on an energy storage device may be expected to be lower over a given time period or over a given distance travelled.

Alternatively the prescribed distance or prescribed time period may be set to higher values in an urban area. An average speed of a vehicle may be lower in an urban area and therefore when an engine is started NVH associated with engine starting may be more noticeable to a driver when in an urban area. Furthermore, in some situations it is desirable to maximise an amount of time for which an engine is switched on in an urban area. Thus a lower limit of an allowable state of charge of an energy storage device (the minimum SoC level)

Advantageously the SoC threshold may be set to a value sufficiently high to protect an energy storage device from becoming damaged due to excessive draining of charge therefrom.

Further advantageously the prescribed SoC threshold may be set to a value of around 10%, from around 10% to around 20%, from around 20% to around 30%, from around 30% to around 40% and from around 40% to around 50% of an upper limit to the amount of charge that an energy storage device is capable of storing.

The controller may be arranged wherein the prescribed SoC threshold is set to a value sufficient to allow the vehicle to travel the prescribed distance by means of torque provided by the electric machine with the engine off provided a value of driver demanded torque does not exceed a prescribed threshold value.

It is to be understood that in the case of a parallel hybrid electric vehicle an engine start may be required even when the battery SoC is high when the electric machine alone is unable to provide the amount of torque demanded by the driver (driver demanded torque). Thus it may become necessary to start the engine in order to meet the driver's torque demand even though the vehicle has sufficient charge to continue operating in EV mode.

In the case of a series-type HEV, it may also be required to start the engine if an amount of current available from the battery to power the electric machine is insufficient to meet the value of driver demanded torque even though the battery SoC may be above the prescribed threshold for operation with the engine off under lower (or normal) driver demanded torque conditions.

Advantageously the controller may be further arranged upon start-up to control the vehicle to start an engine if an ambient temperature is below a prescribed temperature threshold.

This feature has the advantage that the controller is able to anticipate that a driver of the vehicle may require the vehicle cabin heating system to be activated. Thus the controller may control the vehicle to start the engine in order to provide adequate cabin heating to establish a comfortable environment for the driver.

Further advantageously, the controller may be arranged upon start-up to control a vehicle to start an engine if an ambient temperature is above a prescribed temperature threshold.

This feature has the advantage that the controller is able to anticipate that a driver of the vehicle may require a vehicle cabin air-conditioning system to be activated. Thus the vehicle may start the engine in order to provide adequate power to cool the cabin and establish a comfortable environment for the driver.

According to a further aspect of the invention there is provided a hybrid electric vehicle comprising an engine, an electric machine and a controller as set out in any of the preceding paragraphs.

The vehicle may be provided with a plurality of electric machines. One or more of the electric machines may be operable as a motor. In addition or instead one or more of the electric machines may be operable as a generator.

In addition or instead one or more of the electric machines may be operable as a motor/generator.

According to a still further aspect of the invention there is provided a method of controlling a hybrid electric vehicle having an engine and an electric machine, the method comprising: upon start-up, controlling the electric machine to provide torque to drive a vehicle with an engine off if a state of charge (SoC) of an energy storage device is above an EV-start SoC threshold and to start an engine if a SoC of an energy storage device is below the EV-start SoC threshold, wherein the EV-start SoC threshold is determined to be one selected from amongst a value sufficient to allow a vehicle to travel a prescribed distance before a SoC falls below a SoC minimum level at which an engine is started and a value sufficient to allow a vehicle to operate for a prescribed time period before a SoC falls below the SoC minimum level.

According to yet another aspect of the invention for which protection is sought there is provided a controller for a hybrid electric vehicle (HEV) having an engine and an electric machine, the controller being configured to control the vehicle to operate in a parallel mode in which the engine and electric machine provide torque to propel the vehicle and an electric vehicle (EV) mode in which the electric machine alone provides torque to propel the vehicle, the controller being arranged upon start-up to control the vehicle to operate in EV mode if the battery state of charge (SoC) is above a prescribed SoC threshold and to start the engine if the battery SoC is below the prescribed SoC threshold.

According to a further aspect of the invention there is provided a hybrid electric vehicle comprising an engine, an electric machine and a controller according to the preceding paragraph.

According to another aspect of the invention for which protection is sought, there is provided a controller for a hybrid electric vehicle (HEV) having an engine and an electric machine, the controller being configured upon start-up to control the electric machine to provide torque to drive the vehicle with the engine off if the battery state of charge (SoC) is above a prescribed SoC threshold and to start the engine if the battery SoC is below the prescribed SoC threshold.

The HEV may be a series-type HEV in which the engine is not configured to provide motive torque.

According to a still further aspect of the invention for which protection is sought, there is provided a method of controlling a hybrid electric vehicle having an engine and an electric machine, the method comprising: upon start-up, controlling the electric machine to provide torque to drive the vehicle with the engine off if the battery state of charge (SoC) is above a prescribed battery SoC threshold and starting the engine if the battery SoC is below the prescribed battery SoC threshold.

According to another aspect of the invention for which protection is sought there is provided a method of controlling a hybrid electric vehicle having an engine and an electric machine, the method comprising: upon start-up, controlling the vehicle to operate in EV mode if the battery state of charge (SoC) is above a prescribed SoC threshold and starting the engine if the battery SoC is below the prescribed SoC threshold.

In one embodiment of the invention there is provided a controller for a hybrid electric vehicle (HEV) having an engine and an electric machine, the controller being configured upon start-up to control an electric machine to provide torque to drive a vehicle with an engine off if a state of charge (SoC) of an energy storage device is above an EV-start SoC threshold and to start an engine if a SoC of an energy storage device is below the EV-start SoC threshold, wherein the EV-start SoC threshold is determined responsive to one or more vehicle operating parameters.

The one or more vehicle operating parameters may be one or more state parameters indicative of a current state of a vehicle. One of the parameters may correspond for example to an amount of current being drained by an energy storage device of a vehicle at a present time. Alternatively or in addition one parameter may correspond to an amount of current that it is determined that a vehicle is likely to draw during at least an initial portion of a journey the vehicle is to make. This determination may be made with or without data in respect of a route a vehicle is to take or of a destination of a vehicle.

Within the scope of this application it is envisaged that the various aspects, embodiments, examples, features and alternatives set out in the preceding paragraphs, in the claims and/or in the following description and drawings may be taken independently or in any combination thereof. Features described in connection with one embodiment are applicable to all embodiments, except where there is incompatibility of features.

BRIEF DESCRIPTION OF THE DRAWINGS

Embodiments of the invention will now be described, by way of example only, with reference to the accompanying figures in which.

DETAILED DESCRIPTION

Figure 1:
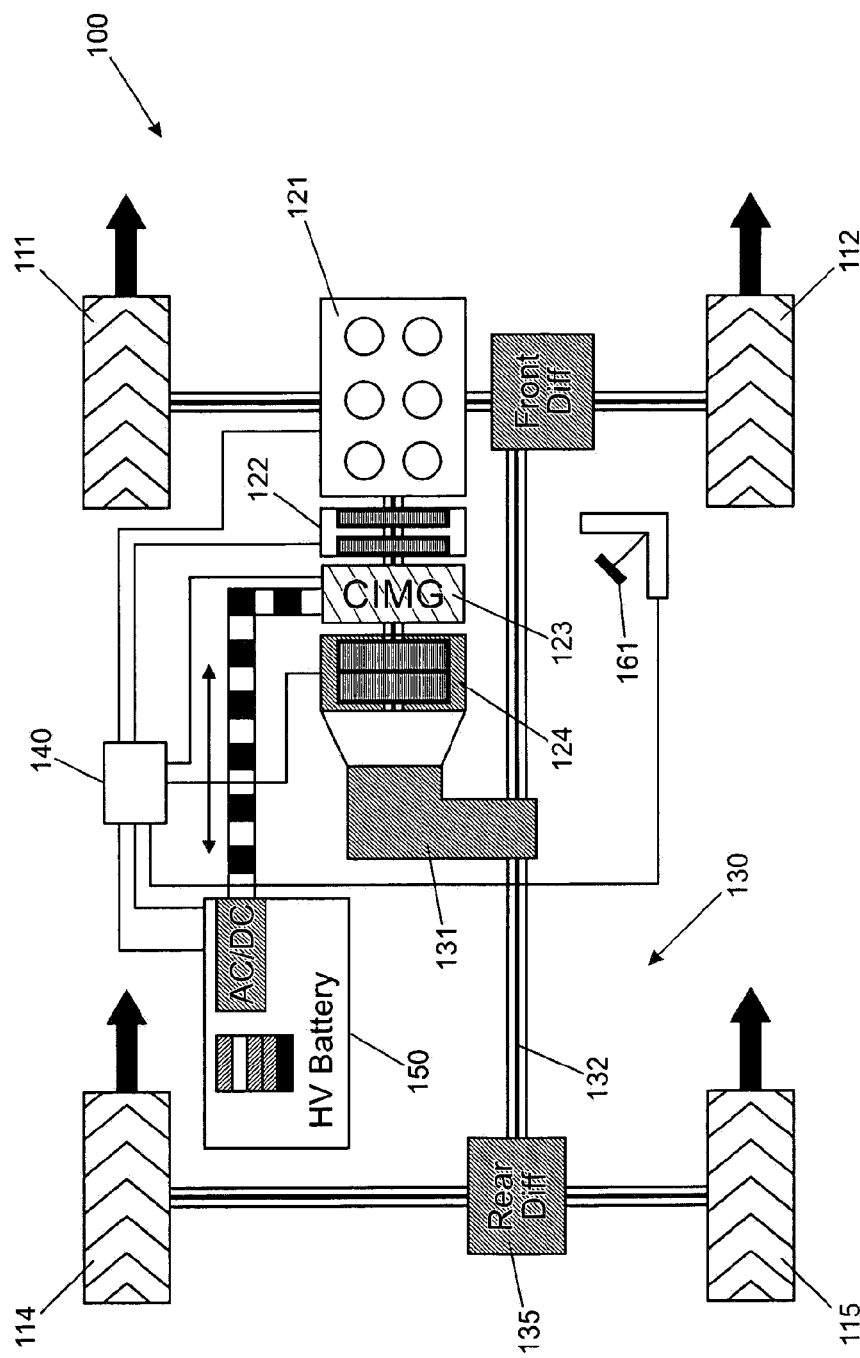
FIG. 1 is a schematic illustration of a hybrid electric vehicle according to an embodiment of the invention.

A hybrid electric vehicle (HEV) 100 according to an embodiment of the present invention is shown schematically in FIG. 1. The HEV 100 has an internal combustion engine 121 releasably coupled to a crankshaft integrated motor/generator (CIMG) 123 by means of a clutch 122. The CIMG 123 is in turn coupled to an automatic transmission 124. The transmission 124 is arranged to drive a pair of front wheels 111, 112 of the vehicle by means of a corresponding pair of front drive shafts 118. The vehicle 100 also has an auxiliary driveline 130 arranged to drive a pair of rear wheels 114, 115 by means of an auxiliary driveshaft 132 (or propshaft 132) and a rear differential 135.

A battery 150 is provided that may be electrically coupled to the CIMG 123 in order to allow the CIMG 123 to generate torque when the CIMG 123 is operated as a motor. Alternatively the battery 150 may be electrically coupled to the CIMG 123 to receive charge from the CIMG 123 when the CIMG 123 is operated as a generator in order to recharge the battery 150.

The vehicle 100 is configured to operate in a parallel mode or an electric vehicle (EV) mode.

In the parallel mode of operation the clutch 122 is closed and the engine 121 is arranged to provide torque to the transmission 124 through the CIMG 123. In this mode the CIMG 123 may be operated either as a motor or as a generator.

In the EV mode of operation the clutch 122 is opened and the engine 121 is turned off. Again, the CIMG 123 is then operated either as a propulsion motor or as a generator. The CIMG 123 may be operated as a motor in order to drive the vehicle or as a generator in order to effect regenerative braking of the vehicle 100.

The vehicle 100 has a controller 140 arranged to control the vehicle 100 to transition between the parallel and EV modes depending on a variety of parameters associated with the vehicle 100 and driver actions that will not be discussed herein.

It is to be understood that when an operator of the vehicle 100 initially starts the vehicle 100 the vehicle 100 is controlled to transition from a 'not ready' state in which the vehicle 100 is not ready to move to a 'ready' state in which the vehicle 100 is ready move. By ready to move is meant that if a driving mode of the transmission 124 is selected and an accelerator pedal 161 of the vehicle 100 is depressed the vehicle 100 may be driven.

In the embodiment of FIG. 1 the vehicle 100 is operable to transition from the 'not ready' state to the 'ready' state by pressing a 'START' button. It is to be understood that in a non-hybrid vehicle pressing a START button (or turning a key to a START position) typically results in starting of the engine.

However in a HEV the engine 121 may not start immediately upon selecting START. For example in the case of a mild hybrid vehicle (being a 'stop-start' vehicle not having an EV mode) pressing the START button may not result in an engine start until the accelerator pedal 161 is depressed.

In a 'full' hybrid electric vehicle 100 according to the present invention (a 'full' HEV being a HEV having an EV mode in which the engine may be switched off) the controller 140 is arranged to determine whether to start the vehicle in EV mode or parallel mode upon the START button being pressed. In some embodiments the controller 140 determines whether to start in EV mode or parallel mode when a driving mode of the transmission 124 is selected. In some embodiments the controller 140 determines whether to start in EV mode or parallel mode when the accelerator pedal 161 is depressed.

The controller 140 is arranged to determine the required mode responsive to the state of charge (SoC) of the battery 150, an ambient temperature of the environment in which the vehicle is operating and a determination whether the vehicle 100 is likely to be able to travel a prescribed distance in EV mode before requiring a transition to a parallel mode. In some alternative embodiments the controller 140 is arranged to determine the required mode responsive to a determination whether the vehicle 100 is likely to be able to operate for a prescribed time period in EV mode before requiring a transition to a parallel mode. By the term 'operate' is included standing of the vehicle or travel of the vehicle.

In the embodiment of FIG. 1 the controller 140 is arranged to determine how far the vehicle may travel in EV mode given the current SoC of the battery 150 and a likely charge drain on the battery 150 whilst driving. If the distance exceeds a prescribed distance and the ambient temperature is within a prescribed range (being above a lower threshold value and below an upper threshold value) the controller 140 is arranged to start the vehicle in EV mode. Thus, the engine 121 is not started when the START button is pressed or the accelerator pedal 161 is depressed.

It is to be understood that the upper and lower temperature threshold values may be selected to bound a temperature range over which it is anticipated that an operator of the vehicle will not require activation of an engine-driven heating or air-conditioning system of the vehicle 100. In some embodiments the vehicle 100 is arranged to allow the operator to set values of the upper and lower temperature thresholds according to his or her preference.

In determining the distance the vehicle 100 is likely to be able to travel, the vehicle is configured to check several vehicle state parameters indicative of a likely charge drain on the battery 150 whilst the vehicle 100 is operating. The state parameters include an operational state of one or more vehicle accessories such as an infotainment system, an operational state of one or more electrical heating elements such as a front or rear windscreen demist heating element, an ambient light level indicating a likelihood that one or more vehicle running lights may require to be activated, an operational state of one or more vehicle running lights (for example whether running lights are activated or not, and optionally a setting of the lights such as side lights only, side lights and headlights, or sidelights and full beam headlights), a vehicle loading and a determination whether a vehicle is towing a load. Data in respect of vehicle loading may be obtained by one of a variety of different means, for example by reference to a pitch angle of a vehicle, a vehicle suspension system or one or more other parameters or systems. Data in respect of whether a vehicle is towing a load may be obtained by reference to whether an electrical lighting board of a towed object such as a trailer has been connected to the vehicle 100 or one or more towing sensors.

Figure 2:
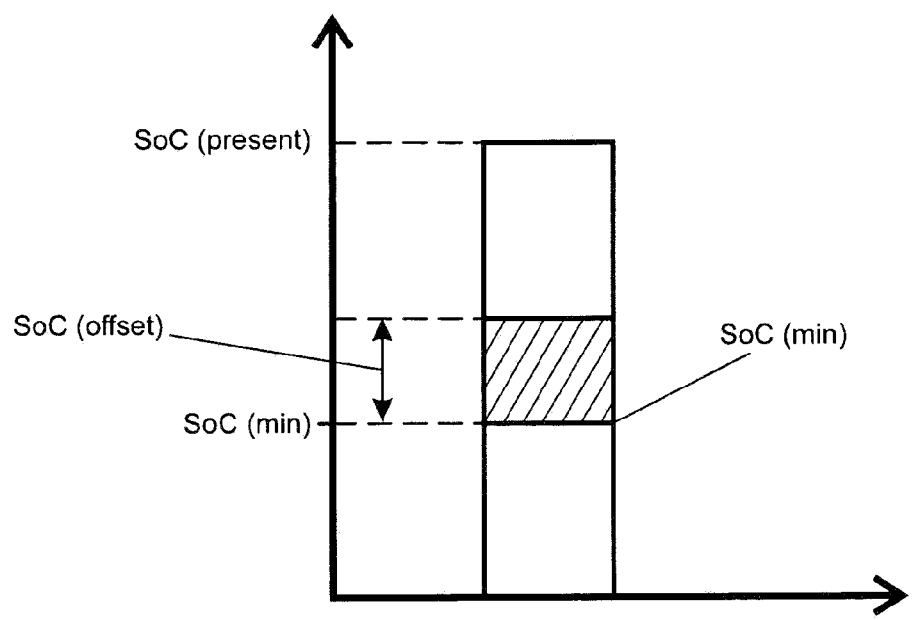
FIG. 2 shows a relationship between parameters SoC (min) and SoC(offset).

In some embodiments the controller 140 is configured to determine a value of a state of charge offset parameter SoC(offset) being a parameter indicative of an amount of charge the vehicle 100 is likely to draw from the battery 150 in order to travel the prescribed distance. This parameter is indicated in FIG. 2 which illustrates a relationship between a minimum allowable SoC of the battery, SoC(min), the value of SoC(offset) and a present value of SoC, SoC (present). If SoC(present) is greater than or equal to a sum of SoC(min) and SoC(offset), the vehicle 100 is configured to commence driving in EV mode. If SoC(present) is less than a sum of SoC(min) and SoC(offset) the vehicle 100 is configured to start the engine 121 and to operate in a parallel HEV mode or other mode in which the engine 121 is employed to drive the vehicle 100.

Embodiments of the invention have the advantage that a more consistent start-up 'feel' may be provided to an operator of the vehicle 100. This is because the vehicle 100 is arranged to launch (or 'initialise') in EV mode rather than parallel mode whenever conditions permit.

In some embodiments of the invention the vehicle 100 is arranged to maintain at substantially all times a battery SoC sufficient for EV operation when required, and sufficient to meet the requirements discussed above for start-up in EV mode.

Thus in some embodiments the vehicle 100 will typically be 'shut down' (entering the 'not ready' mode) at the end of a journey with a battery SoC that is sufficient to allow starting in EV mode and travel of the prescribed distance (or to operate for the prescribed time period) discussed above.

However other arrangements are also useful.

In some embodiments, the prescribed distance may itself be responsive to one or more parameters. In some embodiments the prescribed distance may be responsive to a geographical location of the vehicle 100. Thus if the vehicle 100 is located in an urban area the prescribed distance may differ from that in the case that the vehicle 100 is located away from an urban area. In some embodiments the prescribed distance may be lower in an urban area. In some embodiments the prescribed distance may be greater in an urban area.

In some embodiments of the invention allowing recharging of the battery 150 from an external power source, it is to be understood that it may be necessary to recharge the battery 150 from the external power source in order to permit start-up in EV mode.

It is to be understood that other arrangements are also useful.

A specific embodiment of the invention has been described as implemented in the parallel-type hybrid electric vehicle of FIG. 1. It is to be understood that embodiments of the invention are equally applicable to hybrid vehicles operating in series mode in which the engine 121 does not provide driving torque to a driveline or wheels of the vehicle but rather drives a generator to charge the battery to allow a propulsion motor to drive the vehicle. In some HEVs the generator may be operable to provide electrical power directly to a propulsion motor providing driving torque to one or more wheels.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a hybrid electric vehicle (HEV) having an engine, an electric machine, and an energy storage device, the controller being configured to upon startup:
control the electric machine to provide torque to drive the vehicle with the engine off if a state of charge (SoC) of the energy storage device is above an EV-start threshold ($SoC_{EV\text{-}start}$) and to start the engine if the SoC of the energy storage device is below $SoC_{EV\text{-}start}$, wherein $SoC_{EV\text{-}start}$ comprises at least one of:
a value sufficient to allow the vehicle to travel a prescribed distance before the SoC falls below a SoC minimum level ($SoC_{min}$) at which the engine is started; and
a value sufficient to allow the vehicle to operate for a prescribed time period before the SoC falls below $SoC_{min}$;
wherein the controller is operable to determine the $SOC_{EV\text{-}start}$ in dependence on historical data in respect of a journey conducted by the vehicle; and
wherein the controller is operable to determine the $SoC_{EV\text{-}start}$ in dependence on energy consumption data in respect of at least a portion of a previous journey made by the vehicle.

2. A controller as claimed in claim 1 wherein the controller is operable to determine the value of the $SoC_{EV\text{-}start}$ in dependence on one or more vehicle state parameters indicative of the amount of charge the energy storage device is likely to be required to provide so as to drive the vehicle with the engine off.

3. A controller as claimed in claim 2 wherein the one or more vehicle state parameters are selected from amongst an amount of current being drawn from a battery, an operational state of one or more vehicle accessories, a state of one or more electrical heating functions, an ambient light level, a state of one or more vehicle running lights, a vehicle weight loading and a determination whether the vehicle is towing a load.

4. A controller as claimed in claim 1 operable to determine the $SoC_{EV\text{-}start}$ in dependence on data in respect of a geographical location of the vehicle.

5. A controller as claimed in claim 1 operable to determine the $SoC_{EV\text{-}start}$ in dependence on data in respect of at least one selected from amongst an average speed of the vehicle on a route from a current geographical location of the vehicle, a speed limit associated with a route of the vehicle from a current geographical location and terrain data in respect of a route of the vehicle from a current geographical location.

6. A controller as claimed in claim 1 wherein the prescribed distance or prescribed time period is itself dependent on one or more parameters.

7. A controller as claimed in claim 1 wherein the prescribed distance or prescribed time period is dependent on a geographical location of a vehicle.

8. A controller as claimed in claim 7 wherein prescribed distance or prescribed time period is dependent on a determination whether a vehicle is located in an urban or non-urban area.

9. A controller as claimed in claim 1 wherein the $SoC_{EV\text{-}start}$ is set to a value sufficiently high to protect the energy storage device from becoming damaged due to excessive draining of charge therefrom.

10. A controller as claimed in claim 1 wherein the $SoC_{EV\text{-}start}$ is set to a value of around 10%, from around 10% to around 20%, from around 20% to around 30%, from around 30% to around 40% and from around 40% to around 50% of an upper limit to the amount of charge that the energy storage device is capable of storing.

11. A controller as claimed in claim 1 further arranged upon start-up to control the vehicle to start the engine if an ambient temperature is above or below a prescribed temperature threshold.

12. A hybrid electric vehicle comprising an engine, an electric machine and a controller as claimed in any preceding claim.

13. A controller for a hybrid electric vehicle (HEV) operable in an electric (EV) mode in which torque to drive the vehicle is provided by an electric machine and a hybrid-electric (HEV) mode in which torque to drive the vehicle is provided by an internal combustion engine when the state of charge (SoC) of an energy storage device is below an SoC minimum level, the controller being configured, upon start-up of the vehicle, to compare the SoC of the energy storage device to an EV-start SoC threshold and to start the vehicle in EV mode when the SoC of the energy storage device is above the EV-start SoC threshold ($SOC_{EV\text{-}start}$) and to start the vehicle in HEV mode engine if the SoC of the energy storage device is below $SOC_{EV\text{-}start}$, wherein $SOC_{EV\text{-}start}$ comprises:
a value sufficient to allow the vehicle to travel a prescribed distance before the SoC falls below a SoC minimum level at which the engine is started; and/or
a value sufficient to allow the vehicle to operate for a prescribed time period before the SoC falls below the SoC minimum level; and
wherein the controller is operable to determine the $SoC_{EV\text{-}start}$ in dependence on historical data in respect of a journey conducted by the vehicle.

14. A controller as claimed in claim 1 wherein the prescribed distance is an initial portion of a journey conducted by the vehicle.

* * * * *

UNITED STATES PATENT AND TRADEMARK OFFICE
CERTIFICATE OF CORRECTION

PATENT NO.         : 9,545,914 B2
APPLICATION NO.    : 13/997528
DATED              : January 17, 2017
INVENTOR(S)        : Phillippa Laing It is certified that error appears in the above-identified patent and that said Letters Patent is hereby corrected as shown below:

In the Claims

Column 9, Claim 1, Line 40:
Please correct "$SOC_{EV\text{-}start}$" to read -- $SoC_{EV\text{-}start}$ --

Column 10, Claim 13, Line 46:
Please correct "$(SOC_{EV\text{-}start})$" to read -- $(SoC_{EV\text{-}start})$ --

Column 10, Claim 13, Line 48:
Please correct "$SOC_{EV\text{-}start}$, wherein $SOC_{EV\text{-}start}$" to read -- $SoC_{EV\text{-}start}$, wherein $SoC_{EV\text{-}start}$ --

Signed and Sealed this
Tenth Day of October, 2017

Joseph Matal
*Performing the Functions and Duties of the*
*Under Secretary of Commerce for Intellectual Property and*
*Director of the United States Patent and Trademark Office*